United States Patent [19]

Sato et al.

[11] Patent Number: 5,753,175
[45] Date of Patent: May 19, 1998

[54] METHOD OF MOLDING A HEAT-RESISTANT CONTAINER AND A SET OF MOLDS FOR THE METHOD

[75] Inventors: Koichi Sato; Kazuyuki Yokobayashi, both of Ueda; Yoichi Tuchiya, Nagano-ken; Kazuya Kitamura, Nagano, all of Japan

[73] Assignee: Nissei ASB Machine Co., Ltd., Komoro, Japan

[21] Appl. No.: 581,220

[22] Filed: Dec. 29, 1995

[30] Foreign Application Priority Data

Dec. 29, 1994 [JP] Japan ................... 6-340514

[51] Int. Cl.⁶ ........................................ B29C 49/18
[52] U.S. Cl. ........................... 264/530; 264/905
[58] Field of Search ..................... 264/530, 905, 264/906; 425/526

[56] References Cited

U.S. PATENT DOCUMENTS

| | | | |
|---|---|---|---|
| 4,318,882 | 3/1982 | Agrawal et al. | 264/905 |
| 4,891,178 | 1/1990 | Ajmera et al. | 264/530 |
| 5,281,387 | 1/1994 | Collette et al. | 425/526 |
| 5,352,402 | 10/1994 | Orimoto et al. | 264/906 |
| 5,389,332 | 2/1995 | Amari et al. | 264/906 |
| 5,510,079 | 4/1996 | Sugiura et al. | 264/906 |

FOREIGN PATENT DOCUMENTS

| | | |
|---|---|---|
| 0 559 103 | 9/1993 | European Pat. Off. . |
| 29 26 044 | 1/1981 | Germany . |
| 59-2820 | 1/1984 | Japan ................... 264/905 |
| WO94/02304 | 2/1994 | WIPO ................... 425/526 |
| WO 94/06617 | 3/1994 | WIPO . |

OTHER PUBLICATIONS

Patent Abstracts of Japan, vol. 10, No. 207 (M–500)(2263), Jul. 19, 1986, JP–A–61 49826, Mar. 11, 1986.
Patent Abstracts of Japan, vol. 9, No. 264 (M–423)(1987), Oct. 22, 1985, JP–A–60–112419, Jun. 18, 1985.

*Primary Examiner*—Catherine Timm
*Attorney, Agent, or Firm*—Oblon, Spivak, McClelland, Maier & Neustadt, P.C.

[57] ABSTRACT

A method of easily molding a heat-resistant container which has a heat-resistant bottom portion, including a steps of primary blow-molding for molding a preform into a primary molded article, a step of heat treatment for the primary molded article, and a step of final blow-molding for molding the primary molded article which has been subjected the heat treatment into a final container, and a mold used for the method. In the step of primary blow-molding a raised-bottom portion is formed in the primary molded article using a raised-bottom mold, and this raised-bottom portion is of substantially the same shape as a raised-bottom portion of the final container. The preform has sufficient heat for a complicated mold, which thereby allows a raised-bottom portion of some complication and with adequate heat-resistance to be formed without difficulty. The shape of the raised-bottom portion of the primary molded article is maintained, and using another raised-bottom molds, heat treatment and final blow-molding are carried out.

9 Claims, 7 Drawing Sheets

METHOD OF MOLDING A HEAT-RESISTANT CONTAINER AND A SET OF MOLDS FOR THE METHOD

BACKGROUND OF THE INVENTION

1. Field of the Invention

The present invention relates to a method of molding a heat-resistant container and a set of molds for the method, and more particularly relates to a method of molding a heat-resistant container which comprises the steps of primary blow-molding, heat treatment, and final blow-molding, and also to a set of molds of the method.

2. Prior Art

The three-stage method of molding a heat-resistant container, which comprises the steps of primary blow-molding, heat treatment, and final blow-molding, is known from disclosures in Japanese Patent Publication Nos. 4-39416 and 6-88314.

When a container is formed by injection-stretch blow-molding, there is a tendency for the bottom of the container to be insufficiently extended, so that when filled with high-temperature contents the resulting contraction leads to thermal deformation, or to a change in capacity.

It has therefore been proposed in Japanese Patent Publication No. 57-57330 to provide ribs on the bottom of a container, or in Japanese Patent Publication No. 6-62157 a plurality of square pyramids arranged in concentric circles, whereby the aforesaid problems with the container base might be solved.

In the above three-stage method of molding a heat-resistant container, a bottom of container is generally provided with shaping of these kinds in the step of final blow-molding. In order to form these complicated shapes in the step of final blow-molding without deformation on charging with high-temperature contents, it is necessary to apply an adequate amount of heat to the bottom of product in the step of primary blow-molding.

However, if there are unstretched portions in a primary molded article in the step of primary blow-molding, since these portions will generally be thicker than other stretched portions, it is difficult to apply adequate heat for forming in the short interval of the step of heat treatment.

Moreover, applying this amount of heat to the bottom of the primary molded article may lead to spherulite crystallization in unstretched area, which may impair the appearance of the container.

The conventional response to this has been to stretch the bottom of the primary molded article as much as possible, to reduce unstretched area, and prevent spherulite crystallization.

When the bottom of the primary molded article is stretched as much as possible in this way, -in an attempt to reduce unstretched area, and prevent spherulite crystallization the adjustments required for this formation are very difficult, and it is made difficult to obtain the required thickness distribution for the rest of the container, so that even if the reduction of unstretched area in the bottom is achieved, portions adjacent to the periphery of the bottom, in particular heel portions, tend to become too thin, and problems of heat resistance or mechanical strength may arise.

Again, it is possible to change the shape of the container in order to stretch the bottom, but this leads to a long and bulky container, which requires special equipment for molding, so it is not a practical solution.

SUMMARY OF THE INVENTION

In the light of this, the present invention has as its object the provision of a method of easily molding a heat-resistant container having a heat-resistant bottom portion.

The present invention has as another object the provision of a set of molds which allows a container with a heat-resistant bottom portion to be easily formed.

These objects are achieved according to the present invention by the provision of:

a method of molding a heat-resistant container including a step of primary blow-molding for molding a preform into a primary molded article of a container shape, a step of heat treatment for applying heat treatment to the primary molded article, and a step of final blow-molding for molding the primary molded article to which heat treatment has been applied into a final container form, wherein:

in the primary blow-molding a raised-bottom portion is formed in the bottom of the primary molded article; and the raised-bottom portion is formed in a shape not substantially different from the shape of a raised-bottom portion of the final container.

According to this invention, since in the step of primary blow-molding a raised-bottom portion is formed in the bottom portion of the primary molded article of substantially the same shape as a raised-bottom portion of the final container normally to have sufficient heat for a complicated mold, a raised-bottom portion of some complication and with adequate heat-resistance can be formed without difficulty.

As a result, even when the raised-bottom portion is given a complicated shape, residual stress in the raised-bottom portion can be reduced, and low thermal deformation and high heat-resistance can be achieved.

Another form of the invention is:

a method of molding a heat-resistant container including a step of primary blow-molding for molding a preform into a primary molded article of a container shape, a step of heat treatment for applying heat treatment to the primary molded article, and a step of final blow-molding for molding the primary molded article to which heat treatment has been applied into a final container form, wherein:

in the primary blow-molding a raised-bottom portion is formed in the bottom of the primary molded article; and in the heat treatment and final blow-molding, heat treatment and final blow-molding are carried out with the shape of the raised-bottom portion of the primary molded article substantially maintained.

According to this invention, since heat treatment and blow-molding are carried out with the shape of the raised-bottom portion substantially maintained, there is no necessity to mold a raised-bottom shape during the final blow-molding, and therefore no necessity in the final blow-molding to heat the bottom of the primary molded article more than necessary, and as a result the heat treatment time in the heat treatment can be reduced.

Since moreover there is no necessity for the raised-bottom portion of a primary molded article which has been subjected to heat treatment for a relatively short time in the heat treatment and which has insufficient heat content, to be formed into a complicated shape during the final blow-molding, a raised-bottom portion can be molded such that residual stress in the raised-bottom portion is reduced, and low thermal deformation and high heat-resistance can be achieved.

Another form of the invention is:

a method of molding a heat-resistant container including a step of primary blow-molding for molding a preform into a primary molded article of a container shape, a step of heat treatment for applying heat treatment to the primary molded article, and a step of final blow-molding for molding the primary molded article to which heat treatment has been applied into a final container form, wherein:

in the primary blow-molding a raised-bottom portion is formed in the bottom of the primary molded article using a first raised-bottom mold; and in the final blow-molding, blow-molding is carried out with the shape of the raised-bottom portion of the primary molded article substantially maintained using a second raised-bottom mold.

According to this invention, since there is no necessity to mold a raised-bottom shape during the final blow-molding, and therefore no necessity in the final blow-molding to heat the bottom of the primary molded article more than necessary, as a result a raised-bottom portion can be molded such that residual stress in the raised-bottom portion is reduced, and low thermal deformation and high heat-resistance can be achieved.

It is further preferable in this invention that in the primary blow-molding the first raised-bottom mold is heated to anneal the raised-bottom portion of the primary molded article.

By this means, residual stress occurring during primary blow-molding is relieved, and greater resistance to thermal deformation and improved heat-resistance are obtained.

In this case, it is preferable that the temperature of the first raised-bottom mold in the primary blow-molding is between 80° C. and 110° C.

This enables the annealing process to be carried out without causing thermal deformation of the raised-bottom portion during mold-release.

It is further preferable in the present invention that the second raised-bottom mold in the final blow-molding is at a temperature such as to cause substantially no deformation in the raised-bottom portion of the final container during the final blow-molding and mold-release.

In this case, the temperature of the second raised-bottom mold in the final blow-molding is not more than 80° C.

In this way, since the second raised-bottom mold in the final blow-molding is at a temperature such as to cause substantially no deformation in the raised-bottom portion of the final container during the final blow-molding and mold-release, and in particular is at no more than 80° C., blow-molding can be carried out in the final blow-molding while maintaining the shape of the raised-bottom portion formed in the primary blow-molding, the occurrence of residual stress in the final blow-molding can be prevented, and a raised-bottom portion can be molded of low thermal deformation and high heat-resistance.

Further according to this invention, it is preferable that a third raised-bottom mold is provided in the heat treatment, and the third raised-bottom mold is used to apply heat treatment to the raised-bottom portion of the primary molded article; and in the heat treatment the temperature of the third raised-bottom mold is at a temperature such as to cause substantially no deformation in the raised-bottom portion of the primary molded article during the heat treatment and mold-release after the heat treatment.

By this means the shape of the raised-bottom portion can be maintained during the heat treatment, the occurrence of residual stress in the heat treatment can be prevented, and a raised-bottom portion can be molded of low thermal deformation and high heat-resistance.

Further according to this invention, it is preferable that the first raised-bottom mold in the primary blow-molding is of a different shape from the second and third raised-bottom molds in the final blow-molding and heat treatment, and such that the second and third raised-bottom molds in the final blow-molding and heat treatment are formed in a nonengaging relationship to the raised-bottom portion of the primary molded article in the circumferential direction.

In this way, in the transport from the stage of primary blow-molding to the stage of heat treatment and the stage of final blow-molding, positioning in the circumferential direction of the raised-bottom portion of the primary molded article with respect to the raised-bottom molds can be omitted, and the apparatus correspondingly simplified.

Further according to this invention, it is preferable that the first raised-bottom mold in the primary blow-molding, the second raised-bottom mold in the final blow-molding and the third raised-bottom mold in the heat treatment are of substantially the same shape.

In this way, it is necessary to carry out positioning in the circumferential direction of the raised-bottom portion of the primary molded article in the heat treatment and final blow-molding, but in the heat treatment and final blow-molding an annealing process can be carried out, whereby a raised-bottom portion can be molded of low thermal deformation and high heat-resistance, and moreover in the heat treatment and final blow-molding less precise control of the pressure of compressed air supplied is required.

Further according to this invention, it is preferable that in the heat treatment and the final blow-molding, heat treatment and final blow-molding are carried out using an air pressure such as to cause substantially no deformation in the raised-bottom portion of the primary molded article.

In this way, the occurrence of residual stress in the raised-bottom portion of the primary molded article in the heat treatment and in final blow-molding can be prevented, and a raised-bottom portion with low thermal deformation and high heat-resistance can be molded.

A set of molds of the present invention is:

a set of molds used in a method of molding a heat-resistant container including a step of primary blow-molding for molding a preform into a primary molded article of a container shape, a step of heat treatment for applying heat treatment to the primary molded article, and a step of final blow-molding for molding the heat-treated primary molded article into a final container, comprising a primary blow mold for using in the primary blow-molding, the primary blow mold including a first raised-bottom mold which is formed corresponding to a shape of a raised-bottom portion of the final container.

According to this invention, by forming the first raised-bottom mold of the primary blow mold in the primary blow-molding in a shape corresponding to the raised-bottom portion of the final container, in the primary blow-molding a raised-bottom portion of a final container with low residual stress can easily be formed.

According to this invention, it is preferable that the second raised-bottom mold for using in the final blow-molding; and a third raised-bottom mold for using in the heat treatment; and wherein the primary molded article has a raised-bottom portion which includes step portions, and wherein the second and third raised-bottom molds have support surfaces which contact with raised step portions to support the raised-bottom portion of the primary molded article, and are formed in a nonengaging relationship to the raised-bottom portion of said primary molded article in the circumferential direction.

By this means, by supporting the step portions by means of the support surfaces, deformation of the raised-bottom portion in the heat treatment and final blow-molding can be prevented, the occurrence of residual stress can be prevented, low thermal deformation and high heat-resistance can be obtained, and moreover by virtue of the nonengaging relationship with respect to the raised-bottom portion, the necessity of carrying out positioning of the primary molded article with respect to the raised-bottom mold in the heat treatment and final blow-molding can be avoided.

DESCRIPTION OF THE PREFERRED EMBODIMENT

A preferred embodiment of the present invention is now described in detail, with reference to the drawings.

Figure 1:
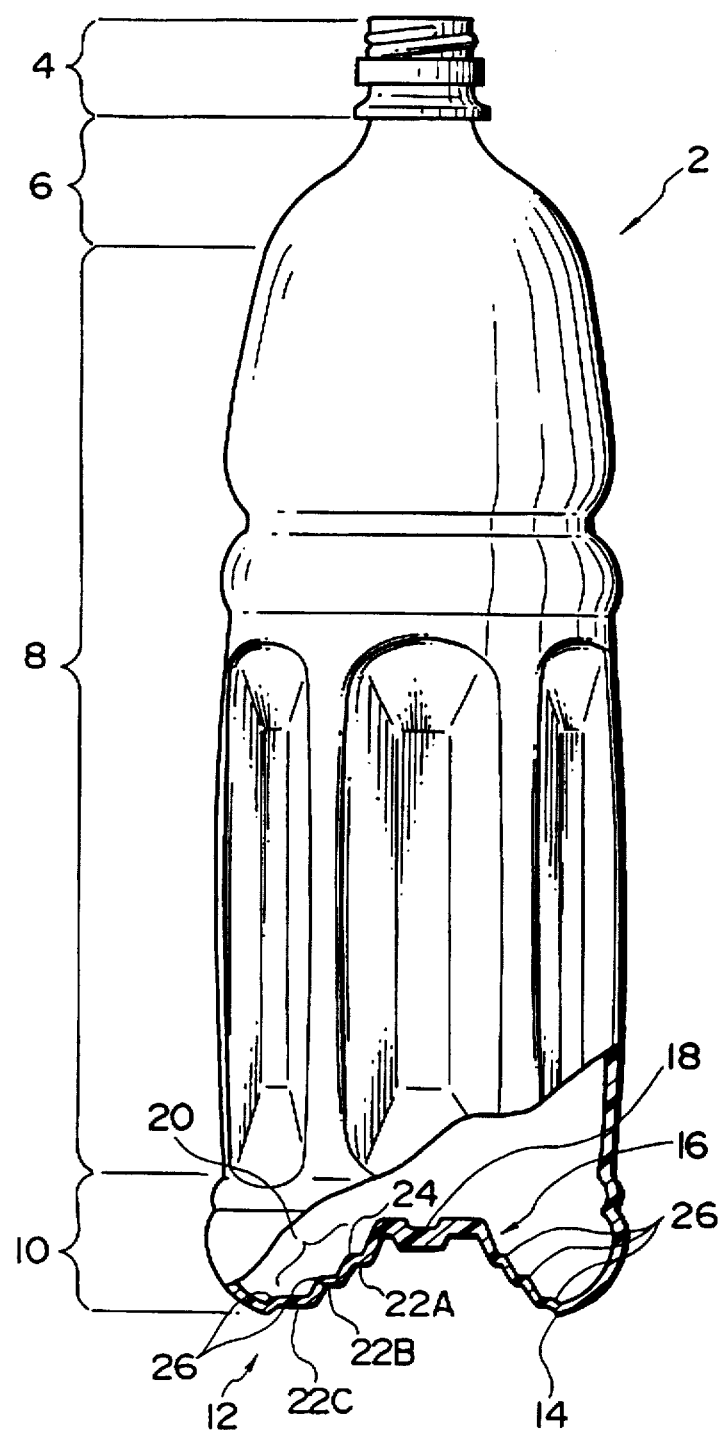
FIG. 1 is a view of a heat-resistant container relating to an embodiment of the present invention, with the bottom partly cutaway along the line I—I in FIG. 2.
Figure 2:
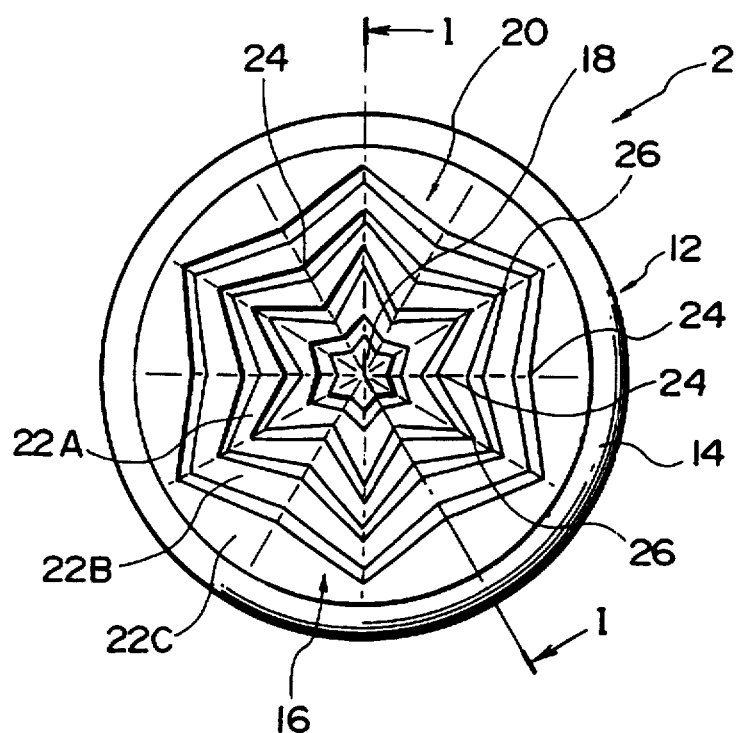
FIG. 2 is an underneath view of the bottom of the container shown in FIG. 1.

FIG. 1 and FIG. 2 show a heat-resistant container relating to an embodiment of the present invention.

The heat-resistant container 2 is molded from a synthetic resin such as polyethylene terephthalate (PET) by stretching both longitudinally and laterally into the form of a container, and comprises a neck portion 4, a shoulder portion 6 extending downward from the neck portion 4 with increasing diameter, a body portion 8 extending downward from the shoulder portion 6, a heel portion 10 extending downward from the body portion 8 with decreasing diameter, and a bottom portion 12 connected to the heel portion 10 and positioned at the bottom end of the container.

In the heat-resistant container 2, the neck portion 4 is generally not stretched, so as to be a thicker material, the body portion 8 is most stretched, so as to be a thinner material, and then the bottom portion 12 is difficult to be stretched, so as to be a thicker material.

The bottom portion 12 comprises an annular support portion 14 positioned on the periphery and adjacent to the heel portion 10, and a raised-bottom portion 16 which projects progressively inward to the container from the annular support portion 14 toward the center, and the annular support portion 14 provides self-supportability.

The raised-bottom portion 16 comprises a reinforcing portion 20 positioned between the annular support portion 14 and a center portion 18. Generally, the bottom portion 12 has almost no stretching applied to the center portion 18, which is thereby of unchanged thickness, and the degree of orientation increases progressively toward the periphery. To ensure sufficient stretching of the raised-bottom portion 16 adjacent to the center portion 18, which has a low degree of orientation, the reinforcing portion 20 is formed in the raised-bottom portion 16 of the bottom portion 12, thus improving the heat-resistance of the bottom portion 12.

Specifically the reinforcing portion 20 comprises a plurality of step portions 22A, 22B and 22C extending circumferentially along contour lines of different heights from the annular support portion 14, and this plurality of step portions 22A, 22B and 22C functions as a set of annular ribs of the reinforcing portions 20.

The step portions 22A, 22B and 22C are further provided with a plurality of concave serrations 24 projecting radially inward and convex serrations 26 projecting radially outward, and alternating around the circumference, whereby the area of the raised-bottom portion 16 is expanded, and the degree of orientation increased.

Again, the concave serrations 24 and convex serrations 26 of the step portions 22A, 22B and 22C are provided such that going progressively from a high position to a low position, the distance from the central axis of the bottom portion increases, and the difference in distance from the central axis between the extremity of an convex serration 26 and the extremity of an concave serration 24 of the step portions 22A, 22B and 22C decreases gradually from the center of the bottom to the annular support portion 14, and as the extremity of an concave serration 24 approaches the adequately stretched annular support portion 14, the degree of stretching of the extremity of the concave serration 24 is thereby increased, and the degree of orientation is thus increased.

By the formation in the raised-bottom portion 16 of the reinforcing portions 20 formed from step portions 22A, 22B and 22C having concave serrations 24 and convex serrations 26, it is possible to improve the heat-resistance during charging with high temperature contents.

Next a method of molding a heat-resistant container according to this embodiment is described with reference to FIGS. 3 to 9.

Figure 3:
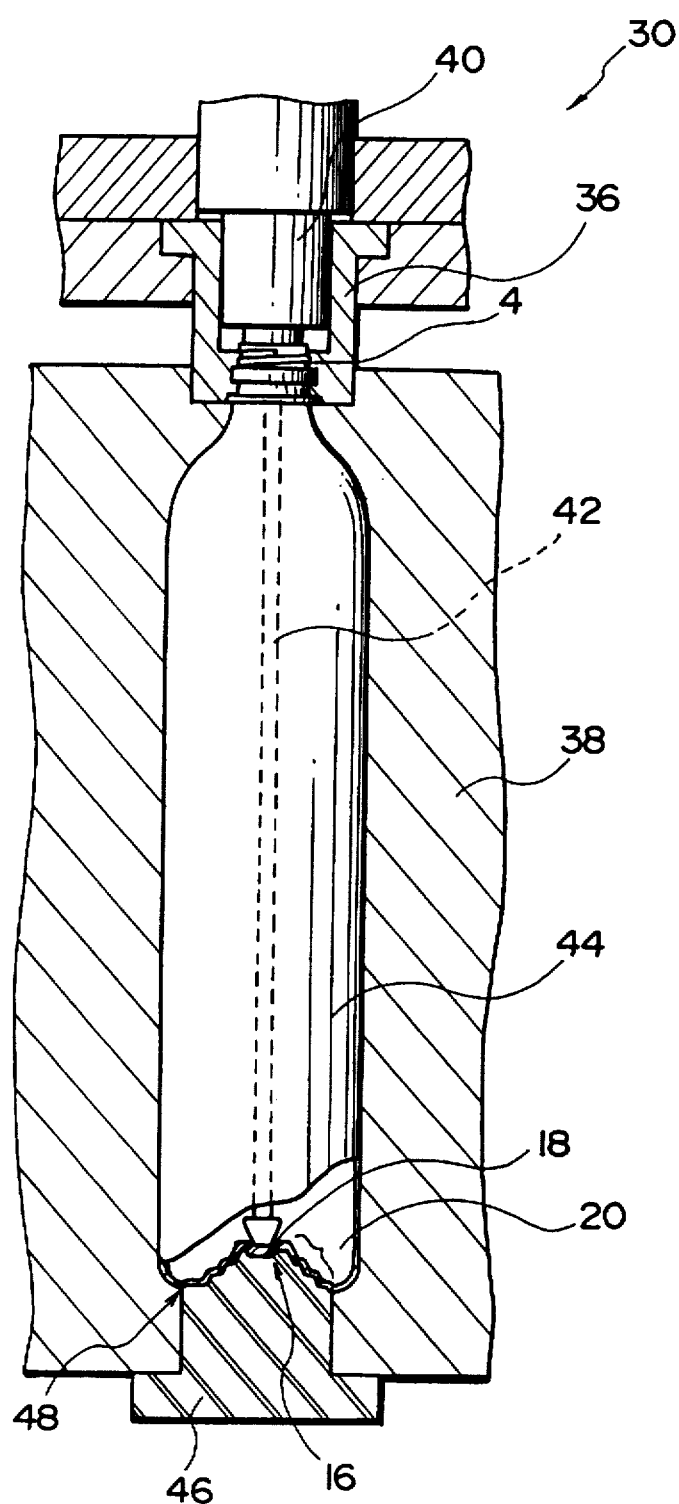
FIG. 3 is a sectional view showing a step of primary blow-molding in the method of molding a heat-resistant container according to an embodiment of the present invention.
Figure 5:
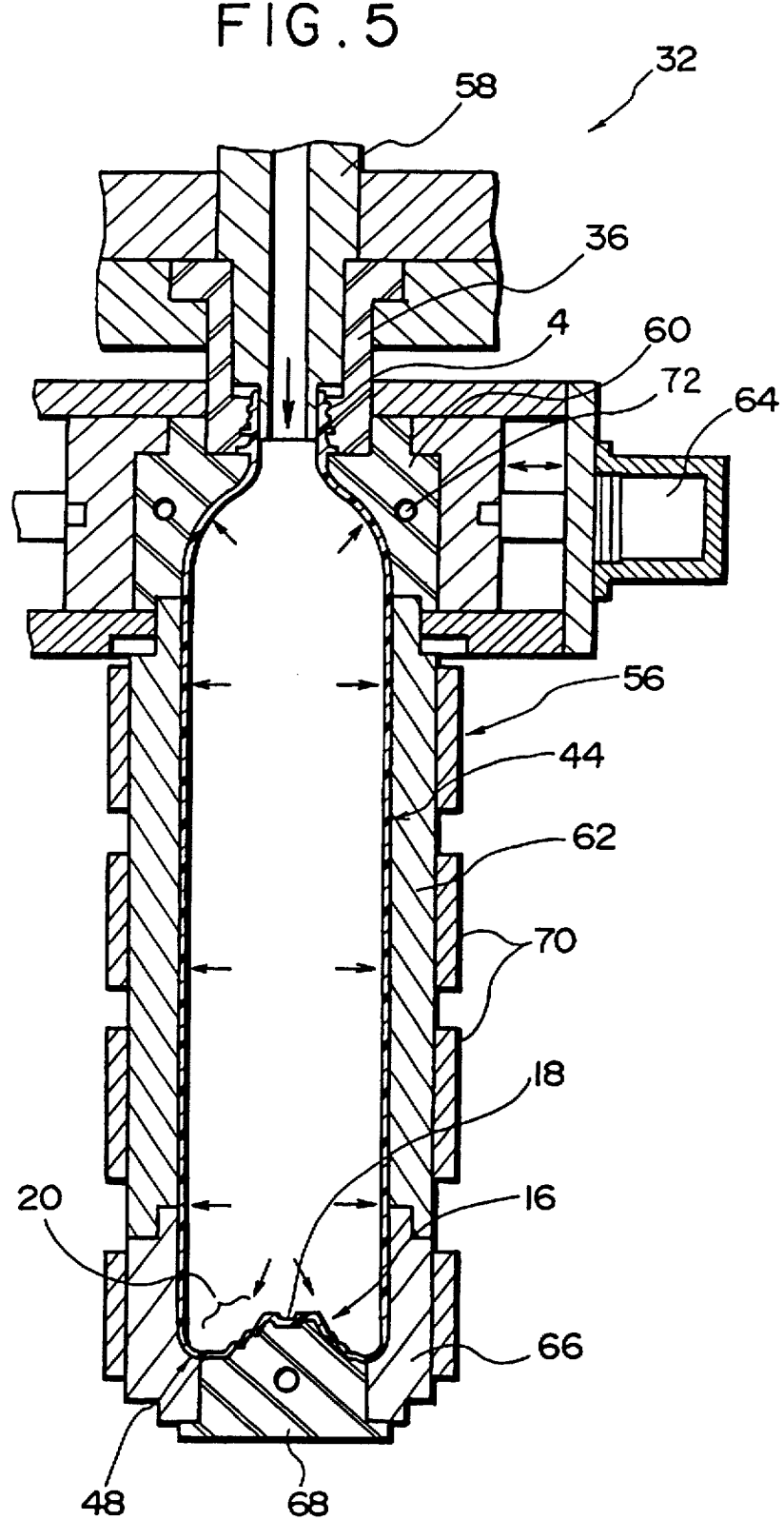
FIG. 5 is a sectional view showing a step of heat treatment in the molding method according to this embodiment.
Figure 6:
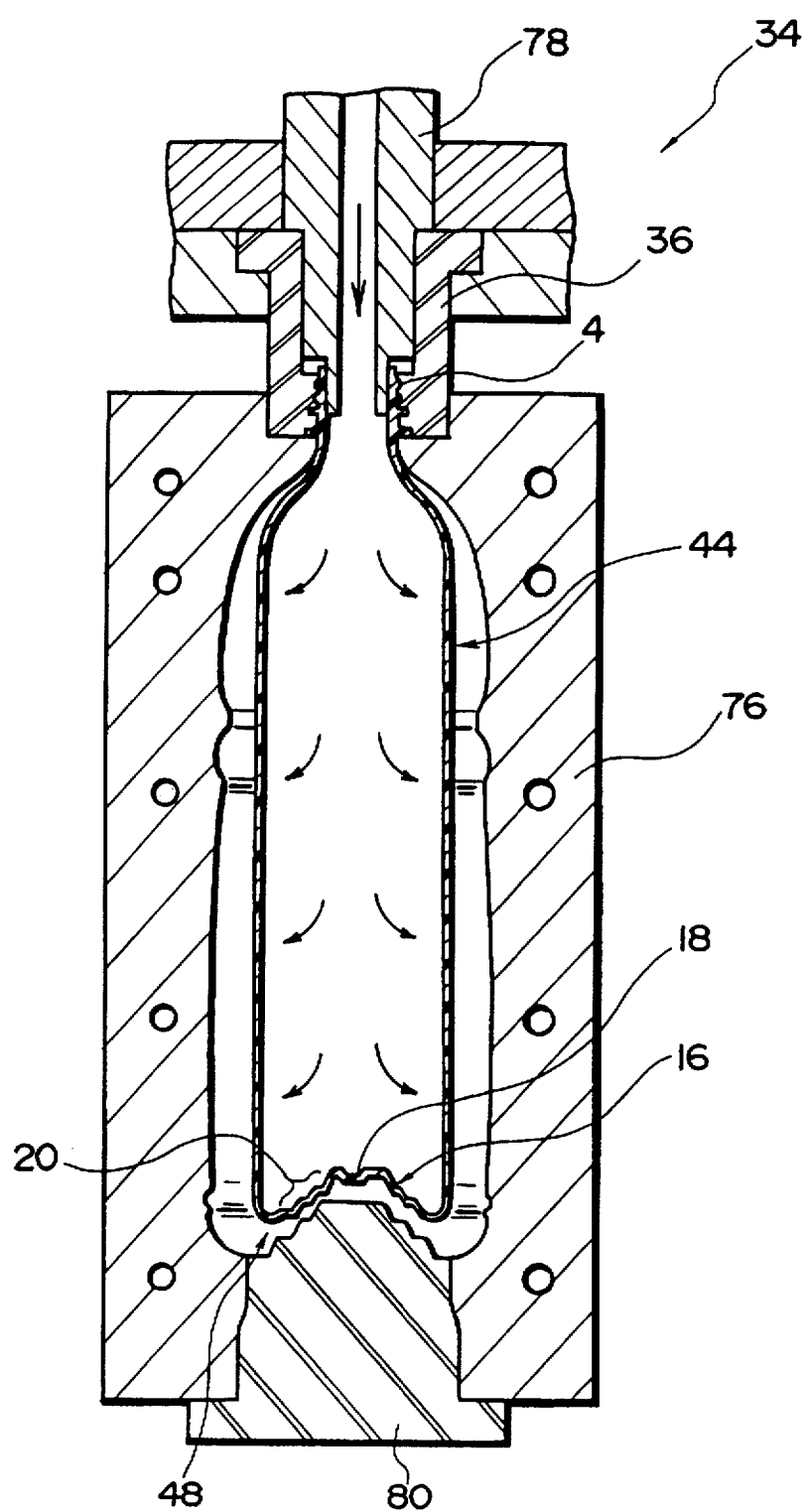
FIG. 6 is a sectional view showing a step of final blow-molding in the molding method according to this embodiment.

This method of molding a heat-resistant container comprises a step of primary blow-molding carried out by a primary blow-molding unit 30 shown in FIG. 3, a step of heat treatment carried out by a heat treatment unit 32 shown in FIG. 5, and a step of final blow-molding carried out by a final blow-molding unit 34 shown in FIG. 6.

In the primary blow-molding unit 30, with the neck portion 4 held by a neck mold 36, a preform (not shown in the drawing) of the heat-resistant container is inserted into a primary blow cavity mold 38, and the neck mold 36 and primary blow cavity mold 38 are combined. Next a blow core mold 40 is introduced into the neck mold 36, and a stretching rod 42 passing through the blow core mold 40 and neck mold 36 is inserted into the preform, and as this stretching rod 42 is extended downward the preform is stretched longitudinally, and at the same time compressed air is introduced from the blow core mold 40 into the preform and stretches the preform laterally, whereby the preform is formed into a primary molded article 44 in the form of a container.

In this case, the primary blow cavity mold 38 has an inner wall which is somewhat larger than that of the heat-resistant container 2 which is the final product, and thus forms a primary molded article 44 which is somewhat larger than the heat-resistant container 2 which is the final product.

The bottom of the primary blow cavity mold 38 is provided with a raised-bottom mold 46, and by means of this raised-bottom mold 46, a raised-bottom portion 16 is formed in the bottom portion 48 of the primary molded article 44.

Figure 4:
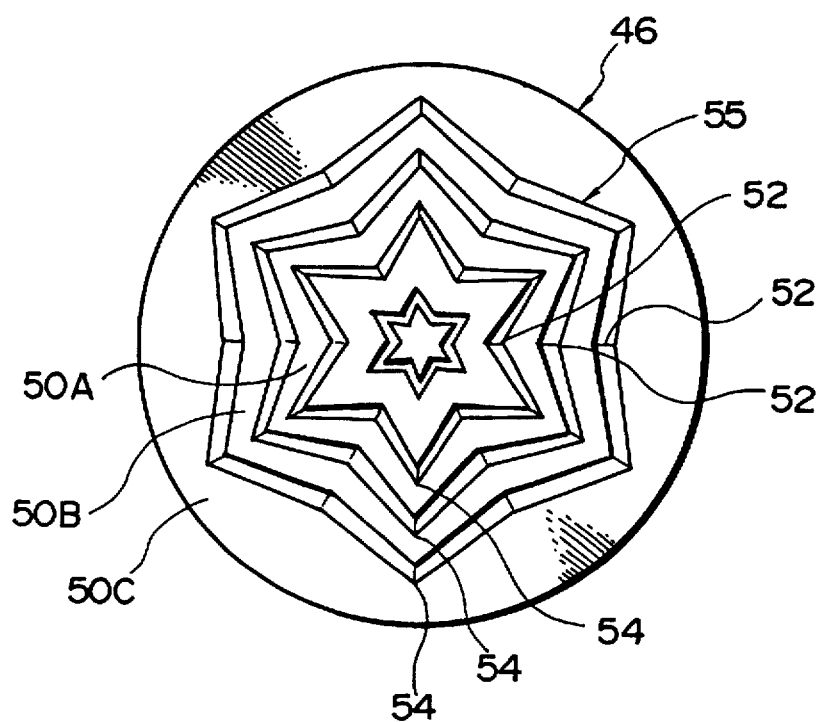
FIG. 4 is an underneath view of the bottom of the product of the step of primary blow-molding shown in FIG. 3.

This raised-bottom mold 46, as shown in FIG. 4, has a shape corresponding to the raised-bottom portion 16 of the heat-resistant container 2, and thus is provided with step forming portions 50A, 50B and 50C positioned to correspond with the step portions 22A, 22B and 22C of the raised-bottom portion 16. These step forming portions 50A, 50B and 50C are each provided with reinforcing portion forming portions 55 having concave serration forming portions 52 and convex serration forming portions 54 corresponding to the concave serrations 24 and convex serrations 26.

As a result, by carrying out the primary blow-molding of the preform within the primary blow cavity mold 38, using the raised-bottom mold 46, in the bottom portion 48 of the primary molded article 44 is formed a raised-bottom portion 16 having a shape substantially unchanged from the shape of the raised-bottom portion of the heat-resistant container 2.

The conditions for molding the primary molded article 44 by the primary blow-molding unit 30 are that: the surface temperature of the preform immediately before primary blow-molding should be about 100° C. to 130° C.; with the temperature in the primary blow cavity mold 38 at unadjusted room temperature; the temperature of the raised-bottom mold 46 should be, within the limits of the raised-bottom portion 16 not deforming when the primary molded article 44 is removed from the primary blow cavity mold 38, a temperature such as to provide an annealing effect, preferably from 80° C. to 110° C.; the pressure of the compressed air used for the primary blow-molding should be 20 kg/cm²; and the molding time should be of the order of 25 seconds.

In this way, by carrying out the step of primary blow-molding to form the bottom portion 48 of the primary molded article 44 with a raised-bottom portion 16 having a shape substantially unchanged from the shape of the raised-bottom portion of the final product, that is, by forming the raised-bottom portion 16 during primary blow-molding for the preform having sufficient heat for a complicated mold, a complicated raised-bottom portion can be easily formed to obtain satisfactory heat-resistance, and moreover, even when providing a complicated shape, the residual stress in the raised-bottom portion 16 can be reduced, and the raised-bottom portion can be formed with low thermal deformation and high heat-resistance.

The heat treatment unit 32 has a heat-treatment core mold 58 disposed so as to be movable vertically above a heat-treatment mold 56, and the primary molded article 44 is, within the heat-treatment mold 56, while pressurized from within, contacted against the inner walls of the heat-treatment mold 56 and heated.

In this case, because the primary molded article 44 expands from the neck portion 4 to the shoulder, and is formed into a cylindrical body with almost no unevenness in the axial direction, in the heat-treatment mold 56 the shoulder heating block 60 which corresponds to the shoulder portion of the primary molded article 44 comprises a split mold, and the body heating block 62 which corresponds to the cylindrical body portion of the primary molded article 44 is formed as a circumferentially integral pot shape. The shoulder heating block 60 is adapted to be opened and closed by an opening and closing cylinder 64. A bottom heating block 66 is provided with a raised-bottom mold 68. Around the periphery of the body heating block 62 and bottom heating block 66 is attached a band heater 70, and to the shoulder heating block 60 can be either built in or attached a heater 72. A temperature-adjusting medium is supplied to the raised-bottom mold 68.

Figure 7:
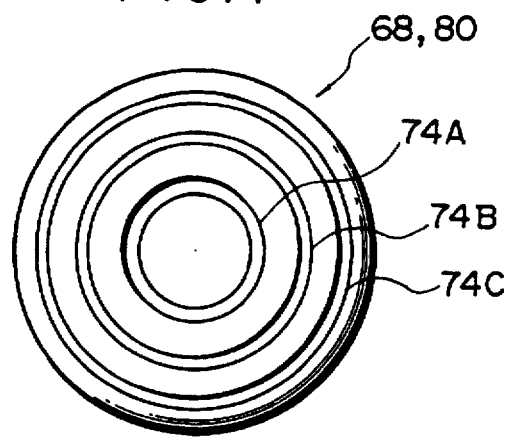
FIG. 7 is a plan view of a raised-bottom mold used in the step of heat treatment and final blow-molding.

Furthermore, the raised-bottom mold 68 has, as shown in FIG. 7, support surfaces 74A, 74B and 74C supporting the step portions 22A, 22B and 22C in the raised-bottom portion 16 of the primary molded article 44, and so as to be in a circumferentially nonengaging relationship to the raised-bottom portion 16, the support surfaces 74A, 74B and 74C are formed as concentric rings.

Figure 8:
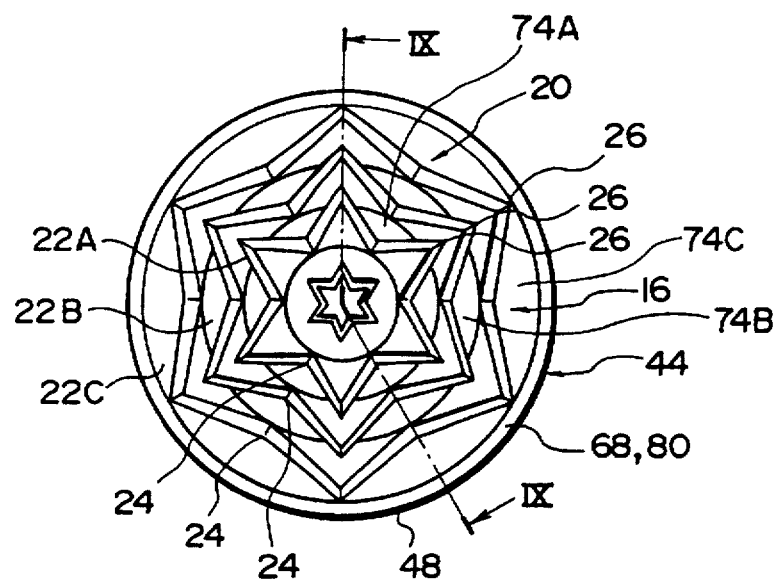
FIG. 8 is a plan view showing the manner in which the raised-bottom portion of the primary molded article is supported using the raised-bottom mold of FIG. 7.
Figure 9:
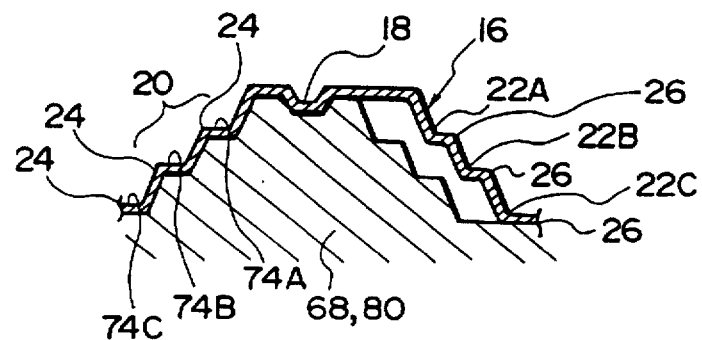
FIG. 9 is a sectional view along the line IX—IX of FIG. 8.

Therefore, when the primary molded article 44 is inserted, even though concave serrations 24 and convex serrations 26 are formed in the step portions 22A, 22B and 22C of the raised-bottom portion 16 as shown in FIGS. 8 and 9, since the support surfaces 74A, 74B and 74C in the raised-bottom mold 68 are ring-shaped with no serrations, the primary molded article 44 can be inserted without requiring any positioning in the circumferential direction with respect to the raised-bottom mold 68. Moreover, since the support surfaces 74A, 74B and 74C support the step portions 22A, 22B and 22C of the raised-bottom portion 16 by contacting the underneath surfaces, even when compressed air is introduced into the heat-treatment mold 56 there is no deformation of the raised-bottom portion 16.

Thus, the primary molded article 44 supported by the neck mold 36 is inserted into the heat-treatment core mold 58 having such a raised-bottom mold 68, compressed air is introduced into the primary molded article 44 from the heat-treatment core mold 58, and the primary molded article 44 is subjected to heat treatment.

In this case, the pressure of the compressed air introduced into the primary molded article 44 is such as not to cause deformation of the raised-bottom portion 16 of the primary molded article 44, being for example in the range of 2 kg/cm² to 10 kg/cm². The temperature conditions for heat treatment are that: the temperature of the shoulder portion is from 150° C. to 220° C., the temperature of the body portion is from 150° C. to 220° C., and the temperature of the raised-bottom portion is such as not to cause deformation during heat treatment or mold unclamping, being for example not more than 80° C. The heat treatment time is of the order of 5 to 10 seconds.

In this way, heat treatment is carried out with air pressure and temperature settings such as not to cause deformation of the raised-bottom portion 16 of the primary molded article 44, and moreover the step portions of the raised-bottom portion 16 are supported by the support surfaces 74A, 74B and 74C of the raised-bottom mold 68, so that deformation of the raised-bottom portion 16 of the primary molded article during the stage of heat treatment is prevented, and the occurrence of residual stress in the raised-bottom portion 16 is prevented, whereby thermal deformation is reduced and heat-resistance improved. Since moreover the support surfaces 74A, 74B and 74C are formed as concentric rings, and are in a nonengaging relationship to the concave serrations 24 and convex serrations 26 of the raised-bottom portion 16 of the primary molded article 44, the primary molded article 44 requires no rotary positioning with respect to the raised-bottom mold 68, and a more compact version of the device is made possible.

After completion of the heat treatment by the heat treatment unit 32, the primary molded article 44 is removed from the heat-treatment mold 56, whereupon the primary molded article 44 is of approximately the same size as the heat-resistant container 2 which is the final product or has shrunk to slightly smaller.

In the final blow-molding unit 34, the primary molded article 44, which has been subjected to the aforesaid heat treatment, is inserted supported by the neck mold 36 into a final blow cavity mold 76, a blow core mold 78 is introduced into the neck mold 36, and compressed air is introduced from this blow core mold 78, and the heat-resistant container 2 which is the final product is formed by blow-molding within the final blow cavity mold 76.

In this case, the bottom of the final blow cavity mold 76 is provided with a raised-bottom mold 80, and the final blow cavity mold 76 and raised-bottom mold 80 have their temperatures adjusted so that when compressed air is introduced into the primary molded article 44 from the blow core mold 78, the primary molded article 44, which has been subjected to the aforesaid heat treatment, hardly expands in the longitudinal direction, but is particularly stretched in the lateral direction to form the heat-resistant container 2.

In this step of final blow-molding, the molding conditions are that: the temperature in the final blow cavity mold 76 is from 80° C. to 100° C., the temperature of the raised-bottom mold 80 is such as not to cause deformation of the raised-bottom portion 16 during blow-molding or during unclamping of the heat-resistant container 2 from the raised-bottom mold 80, being for example not more than 80° C., and preferably not more than 60° C., the pressure of the compressed air introduced during blow-molding is such as not to cause deformation of the raised-bottom portion 16, being for example 20 kg/cm$^2$, and the blow-molding time is in the range of 5 to 15 seconds.

In this way, in the step of final blow-molding, heat treatment is applied by the final blow cavity mold 76 to parts other than the raised-bottom portion 16, so that strain occurring during the final blow-molding is removed, and heat-resistance is improved, and additionally the blow-molding is carried out under conditions of temperature and air pressure such as not to cause deformation of the raised-bottom portion 16, as a result of which deformation during blow-molding and mold unclamping is prevented, and the occurrence of residual stress in the raised-bottom portion 16 during final blow-molding is prevented, whereby a raised-bottom portion 16 of low thermal deformation and high heat-resistance can be obtained.

Again, the raised-bottom mold 80 is of the same form as the raised-bottom mold 68 of the heat-treatment mold 56 shown in FIG. 7, and since the step portions 22A, 22B and 22C of the raised-bottom portion 16 of the primary molded article 44 are supported by this raised-bottom mold 80 during the final blow-molding, deformation of the raised-bottom portion 16 of the primary molded article 44 during the final blow-molding is prevented, the occurrence of residual stress is prevented, and a raised-bottom portion 16 of low thermal deformation and high heat-resistance is formed.

In this way, by blow-molding in the step of primary blow-molding a preform having adequate heat there is almost no occurrence of residual stress, and in the bottom portion 12 of the primary molded article 44 a raised-bottom shape of the heat-resistant container 2 having a complicated shape can be formed easily. Moreover, since the steps of heat treatment and final blow-molding are carried out so as not to deform the raised-bottom portion 16 of the primary molded article 44, there is no occurrence of residual stress in the raised-bottom portion 16 of the primary molded article 44 in the steps of heat treatment and final blow-molding, and thus a heat-resistant container 2 with a raised-bottom portion 16 of low thermal deformation and high heat-resistance can be easily molded.

The present invention is not limited to the above-described embodiment, and various modifications can be made within the scope of the present invention.

For example, in the embodiment described above, the raised-bottom portion, and raised-bottom mold for the primary blow-molding unit have the form and construction shown in FIGS. 2 and 4, but they are not limited to this, and a variety of forms and configurations may be adopted in order to improve mechanical strength or the ability to absorb deformation when the pressure is reduced.

Again, in the embodiment described above, the forms of the raised-bottom mold in the primary blow-molding and the raised-bottom molds in the heat treatment and final blow-molding are different, but the invention is not limited to this, and the form of the raised-bottom mold for heat treatment and for final blow-molding may be the same as that for primary blow-molding, and in this case in the steps of heat treatment and final blow-molding a means of positioning the raised-bottom portion of the primary molded article with respect to the raised-bottom mold will be required. Since it will be possible for the raised-bottom portion to be in intimate contact with the raised-bottom mold, however, by carrying out an annealing process during the heat treatment and final blow-molding, heat-resistance will be improved and the concern for adjusting the compressed air pressure will be removed.

What is claimed is:

1. A method of molding a heat-resistant container comprising:
    a step of primary blow-molding for molding a preform into a primary molded article;
    a step of heat treatment for applying heat treatment to said primary molded article; and
    a step of final blow-molding for molding said primary molded article to which heat treatment has been applied to a final container, wherein:
    in said primary blow-molding step a raised-bottom portion is formed in the bottom of said primary molded article using a first raised-bottom mold; and
    in said final blow-molding step, blowing-molding is carried out with the shape of said raised-bottom portion of said primary molded article substantially maintained using a second raised-bottom mold which contacts with a part of said raised bottom portion which is less than the entirety of said raised bottom portion.

2. The method of molding a heat-resistant container as defined in claim 1, wherein in said primary blow-molding said first raised-bottom mold is heated to anneal said raised-bottom portion of said primary molded article.

3. The method of molding a heat-resistant container as defined in claim 2, wherein the temperature of said first raised-bottom mold in said primary blow-molding is between 80° C. and 110° C.

4. The method of molding a heat-resistant container as defined in claim 2, wherein said second raised-bottom mold in said final blow-molding is at a temperature such as to cause substantially no deformation in said raised-bottom portion of said final container during said final blow-molding and mold-release.

5. The method of molding a heat-resistant container as defined in claim 4, wherein the temperature of said second raised-bottom mold in said final blow-molding is not more than 80° C.

6. The method of molding a heat-resistant container as defined in claim 2, wherein:

- a third raised-bottom mold is provided in said heat treatment, and said third raised-bottom mold is used to apply heat treatment to said raised-bottom portion of said primary molded article; and
- in said heat treatment the temperature of said third raised-bottom mold is at a temperature such as to cause substantially no deformation in said raised-bottom portion of said primary molded article during said heat treatment and mold-release after said heat treatment.

7. The method of molding a heat-resistant container as defined in claim 6, wherein said first raised-bottom mold in said primary blow-molding is of a different shape from said second and third raised-bottom molds in said final blow-molding and heat treatment, and such that said second and third raised-bottom molds in said final blow-molding and heat treatment are formed in a nonengaging relationship to said raised-bottom portion of said primary molded article in the circumferential direction.

8. The method of molding a heat-resistant container as defined in claim 6, wherein said first raised-bottom mold in said primary blow-molding, said second raised-bottom mold in said final blow-molding and said third raised-bottom mold in said heat treatment are of substantially the same shape.

9. The method of molding a heat-resistant container as defined in claim 7, wherein in said heat treatment and said final blow-molding, heat treatment and final blow-molding are carried out using an air pressure such as to cause substantially no deformation in said raised-bottom portion of said primary molded article.

* * * * *